UNITED STATES PATENT OFFICE.

FREDERICK GUTZKOW, OF SAN FRANCISCO, CALIFORNIA.

IMPROVEMENT IN THE MANUFACTURE OF SODA FROM ITS SULPHATE.

Specification forming part of Letters Patent No. 198,293, dated December 18, 1877; application filed August 29, 1877.

*To all whom it may concern:*

Be it known that I, FREDERICK GUTZKOW, of the city and county of San Francisco, and State of California, have invented certain Improvements in the Process of Preparing Caustic Soda; and I do hereby declare the following to be a full, clear, and exact description thereof.

The nature of my invention consists of an improved process of preparing caustic soda, or the carbonate of soda, from sulphate of soda. There are for its operation no apparatus or implements required but such as are commonly used, and generally known in the arts.

A tank or cistern, made of stone, wood, or metal, and provided with a false bottom, or a perforated pipe, or any other appliance by which gas may be drawn or forced through a liquid, is partially filled with sulphite of lime obtained in the course of the process, as will be described hereinafter. Water is added, and sulphurous acid, obtained also in the course of the process, or from any other source, is forced through the pulp until it is fully or quite saturated with the sulphurous gas, and the sulphite of lime has been wholly or partly dissolved. Then sulphate of soda, in a solution or in the dry state, is added, when a precipitation of sulphate of lime will take place, which is removed by filtration or settling, forming a by-product of the process.

The solution of bisulphite of soda thus obtained is run off into a closed vessel or still, and heated to the boiling-point by steam or otherwise, when sulphurous acid will escape with the water vapor, which, after being suitably cooled, is passed into the tank or cistern, where the sulphite of lime is dissolved, as described above.

The solution of the neutral sulphite of soda thus obtained is run into an iron vessel, and about so much quicklime stirred in as the proportion of the sulphite of soda in the solution will require, in order to form caustic soda and sulphite of lime. The sulphite of lime is removed by filtration or settling, and re-enters the course of the process, as described above.

The clear solution of caustic soda thus obtained may be exposed to the action of carbonic acid, and converted into a solution of the carbonate from which the commercial sal-soda, or soda-ash, or bicarbonate is manufactured in the usual way, or it is at once boiled down for caustic soda, when, in the course of the concentration, the sulphite and sulphate of soda which it may still contain will separate.

Having thus described my invention, what I claim, and desire to secure by Letters Patent, is—

The process of making caustic soda or the carbonate of soda from sulphate of soda and lime by means of sulphurous acid, substantially in the manner described.

In witness whereof I have hereunto set my hand and seal.

FREDERICK GUTZKOW. [L. S.]

Witnesses:
JNO. L. BOONE,
FRANK A. BROOKS.